3,057,314
CONTROL SYSTEM
William B. Elmer, Lakewood, Ohio, assignor, by mesne assignments, to the United States of America, as represented by the Secretary of the Navy
Filed Nov. 8, 1945, Ser. No. 627,502
7 Claims. (Cl. 114—25)

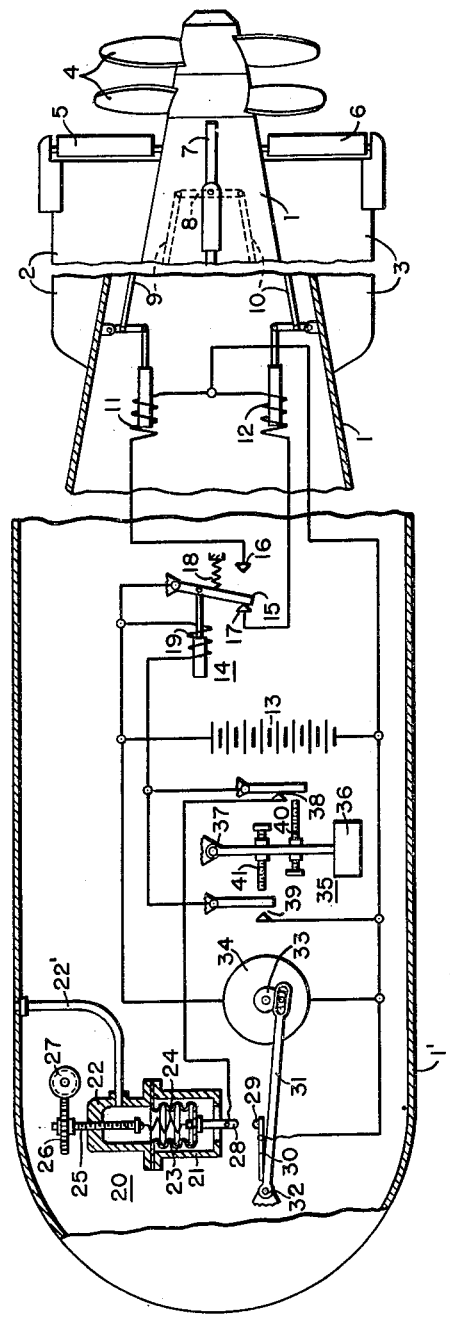

My invention relates to systems for automatically controlling the travel of self-propelled apparatus, especially of the missile type, such as navy torpedoes, aircraft torpedoes, and other surface, submarine or aerial craft for war purposes.

The Government of the United States has been granted a certain royalty-free license for governmental purposes with respect to the invention disclosed herein.

Self-propelled apparatus of such types is usually provided with rudders, elevators or other steering means and the automatic control of these steering means is governed by one or several conditions—responsive devices such as inertia-responsive gyroscopes or pendulums, or pressure gauges. The elevation or depth control for torpedoes, for instance, comprises as a rule a pressure element and a pendulum element mechanically or electrically co-ordinated for effecting a joint control of the elevators in the tail end of the torpedo. In previous constructions, a pendulum has been the primary governing element, causing the elevators to respond to variations in the body angle with respect to the horizontal plane. The pressure element consists of a bellows or diaphragm, actuated by the ambient water pressure, and works against an adjustable biasing spring. In the mechanically co-ordinated designs, the pressure element exerts a force against the pendulum, causing the torpedo to seek that depth at which the pressure just balances the force of the biasing spring so that the pendulum is then free to act unhindered.

Depth controls of this type, as well as other steering controls in which an inertia device provides the primary governing action, are not completely satisfactory for the following reasons:

The inertia device is not only effective when its governing action is desired but operates also in response to acceleration. As a result, a depth-controlled naval torpedo, for instance, dives first below its desired depth; and an aerial torpedo has the tendency to rise immediately after its launching.

In turns, particularly of short radius at high speed, the centrifugal forces on the inertia member have also a disturbing effect and, in the case of a naval torpedo, may cause it to run at excessive depth.

It has also been found that with a control system of the type mentioned, depth oscillations are incurred which are sometimes erratic and may reach serious magnitudes.

It is an object of my invention to devise an automatic steering control system, for self-propelled craft of the type mentioned, that reduces or eliminates the deficiencies of the system previously available. In one of its more specific aspects, the invention aims at providing a system which is especially suitable for controlling the elevation or depth of travel of naval and aerial torpedoes and avoids the elevation errors caused in the above-mentioned systems by the undesired response of the inertia member during periods of acceleration and curved travel.

Another object of my invention is to provide a travel control system which, by means of an oscillatory operation of the steering device, is caused to respond to the governing impulse with such a speed as to greatly reduce the tendency of the craft to oscillate about the desired path of travel.

These and other objects of my invention, as well as the novel means required for achieving them, will be understood from the following description of the example of a depth-control for a naval torpedo shown diagrammatically in the accompanying drawing.

The illustration represents a fragmentary and part-sectional view of the nose and tail ends of a naval torpedo in conjunction with the circuit diagram of the depth control devices.

The tail end 1 of the torpedo body is provided with stabilizing fins 2, 3, and propellers 4. The steering devices comprise two rudders 5 and 6 angularly movable about a vertical axis, and two elevators angularly movable about a horizontal axis, only one elevator, denoted by 7, being visible in the illustration. The means for controlling the rudders and the power means for driving the propellers are not shown in the drawing.

The elevators are linked by a lever 8 and two rods 9, 10 to two solenoid type motors 11 and 12. Energization of solenoid 11 causes the elevators to tilt counterclockwise for ascending travel of the torpedo, and energization of solenoid 12 causes the elevators to tilt clockwise for descending torpedo travel. Electric current for energizing the solenoid is provided from a battery 13 under control by a relay 14 which has a contact 15 movable between two positions in which it engages two stationary contacts 16 and 17 respectively. Hence, only one of the solenoids is energized at a time depending upon the position of the movable contact 15. The movable contact 15 is biased by a spring 18 so that it rests usually against the contact 17. As long as the control coil 19 of relay 14 is excited, however, the contact 15 is forced in opposition to spring 18, to engage the contact 16.

The main condition—responsive device for controlling the excitation of relay coil 19 consists of a pressure-responsive contact device denoted as a whole by 20. The pressure-responsive portion proper of this device is located preferably in the most forward point in the nose 1' of the torpedo and has a housing composed of two parts 21 and 22 which surround a bellows 23 whose interior is in free communication with the interior of part 22. The interior space defined by bellows 23 and part 22 communicates with the outside of the torpedo through a tube 22' whose outer orifice is located near the forward end of the torpedo nose at a point sufficiently away from the curved nose portion where the ambient local pressure is virtually unaffected by velocity pressures and corresponds substantially to the hydrostatic pressure. Hence, the bellows is subject only to the ambient hydrostatic pressure. A biasing spring 24 within the bellows is attached to an adjusting screw 25 which is in threaded engagement with part 22 and revolvable by means of a gear 26 and a pinion 27. Gear 26 is feathered to the upper, unthreaded end of screw 26. The force of spring 24 can be adjusted by turning the shaft of pinion 27 from the outside of the torpedo in accordance with a depth index (not shown). A contact member 28 is mounted on the bellows 23 so that its position along the bellows axis varies in accordance with the ambient water pressure. Since this pressure depends on the depth of travel, the position of member 28 relative to the housing is indicative of that pressure. The part 21 is designed as a retaining structure and prevents excessive expansion of the bellows.

Contact member 28 is engageable with a contact member 29 to open and close the coil circuit of relay 14. Member 29 is mounted on a leaf spring 30 which in turn is attached to a rocking arm 31 pivoted at 32. A crank or cam member 33, driven by an electric motor, or the like, timing device 34, engages the peripheral end of arm 31 and, when in operation, causes the arm with spring 30 to oscillate up and down at a predetermined speed. The drive is preferably geared down to obtain a rocking period of, for instance, about 60 to about 120 complete oscillations per minute depending upon the size and weight of the torpedo.

The coil circuit of relay 14 is also connected to an inertia responsive device 35 whose governing element, in the illustrated example consists of a pendulum 36. The axis of the pendulum pivot 37 extends horizontally and transverse to the axis or path of travel of the torpedo so that the pendulum deflects in one of the other direction from its center position when the path of torpedo travel is inclined relative to a horizontal plane. That is, the pendulum will move angularly about pivot 37 in the counterclockwise direction with reference to the torpedo when the torpedo ascends, and will move clockwise during descending travel. Two contact devices 38 and 39 are associated with the pendulum and are actuated by setscrews 40 and 41 respectively when the angle of pendulous deflection in either direction exceeds a value determined by the setting of the respective setscrews.

Contact device 38 is normally closed and series connected with contact members 28 and 29 in the above mentioned coil circuit of relay 14. Contact device 39 is normally open and lies in parallel to contact device 38 and contact members 28 and 29.

When the torpedo is running, the contact member 28 is positioned by the bellows 23 in accordance with the hydrostatic pressure of the water at the running depth. If the torpedo is launched at a depth much smaller than that at which it is set to run, contact member 28 is lifted away from member 29 to such an extent that the two members remain permanently disengaged. In this case, the drive 34 will continue to run, but the rocking amplitude of contact 29 is then too small to permit a contact engagement. As a result, coil 19 of relay 14 remains de-energized so that relay member 15 closes the circuit of solenoid 12. Hence, the elevators remain adjusted so as to cause the traveling torpedo to descend toward its correct depth. Conversely, if the torpedo is launched greatly below its intended traveling depth, contact member 28 is lowered against member 29 to such an extent that the two members remain permanently in engagement with each other, the rocking motion of arm 31 being absorbed by the flexible spring 30. As a result, the relay coil 19 remains excited so that relay member 15 is forced against contact 16 and energizes the solenoid 11 for causing the elevators to lift the torpedo. If the torpedo has to ascend or descend a larger distance, its angle of inclination toward a horizontal plane would tend to increase until the torpedo approached a vertical position in the water. The angle-responsive inertia device 35 serves to prevent such vertical running. When the angle of descent, with members 28 and 29 permanently disengaged, reaches the limit value set by screw 41, the pendulum deflects clockwise a sufficient amount to close the contact device 39. This causes coil 19 to become energized so that the elevators are switched into ascending position until the body angle of the torpedo is corrected. During ascending travel, with contact members 28 and 29 permanently closed, the occurrence of an excessive body angle causes the pendulum to open the contact device 38 thus releasing the relay 14 for adjusting the elevators into descending position.

Thus, as long as the bellows contacts remain open or closed, the inertia device assumes the function of an angle-limiting control only, and the torpedo cannot travel at steeper body angles than those for which the pendulum contacts are set. The control performance under angle response can be made to operate within very close limits so that the torpedo oscillates only to a small extent about a mean maximum body angle.

When the torpedo approaches its set depth, the responding bellows adjust the contact member 28 to such a position that the relay circuit is interrupted for a portion of each cycle of oscillation of the contact arm 31. Under this operating condition, the elevators are thrown hard over and back once during each cycle, and the torpedo begins to level off.

As the torpedo reaches its set depth, the closed and open intervals of the bellows contacts become approximately equal during each period of oscillation, and the torpedo follows a substantial horizontal course through the water. Any departure from the proper depth will produce a variation in the ratio of the on and off contact periods tending to restore the torpedo to its correct running depth. The location of the bellows control in the nose of the torpedo assures quickest response to depth.

The frequency of oscillation of the contact arm 31 is chosen in relation to the torpedo characteristics so that the torpedo body does not have time to deviate from its course appreciably during the cycle of contact oscillation. In this way, a substantially unvarying course of travel may be obtained.

If the inertia responsive angle control is set for a large angle, and if the amplitude of contact oscillation is made very small with the intention of obtaining a very close control of depth, the torpedo could pass entirely through the depth band in which the cycle control functions and continue to run with large vertical oscillations above and below the set depth. The criteria for avoidance of such operations are predicated upon the relative steepness of the approach to the control band, the vertical turning radius of the torpedo, and the height of the control band. For step angle settings with small elevators, it would be necessary, for example, to use a relatively ample oscillation of the rocking arm. The characteristic of the rocking drive can also be selected in accordance with the desired steering performance. For instance, a cardioid cam or other modified cycle characteristic can be chosen to provide short elevator reversals as the torpedo approaches the depth control band.

It will be understood from the foregoing that the main governing element in the described travel control system is represented by the pressure-responsive bellows so that the latter is alone capable, and in fact normally operative, to determine the course of travel, while the angle-responsive inertia device serves a secondary function only. The operation of a cyclically operating control mechanism so that the main governing element varies the recurrent on and off intervals within each cycle, permits increasing the speed of response to such a degree that excessive depth oscillations, otherwise apt to occur, are safely avoided.

In summary, the invention affords the advantages that the initial dive or rise upon launching of the torpedo is greatly reduced or eliminated; the tendency to dive or rise during curved travel due to centrifugal effects on the inertia device is likewise reduced or eliminated; the elevator action is largely independent of the natural oscillatory period of the torpedo body and not apt to be affected by contact shattering as is the case in the above-mentioned control system previously available. Furthermore, as the frequency of the cycle control is subject to choice, the depth oscillations of the torpedo can be held to any desired minimum, and the system will also inhibit rolling to any desired degree, depending upon the selected elevator (or rudder) period.

Another essential advantage of the invention is its adaptability and inherent versatility with respect to its use for different kinds of traveling vehicles, missiles, or the like apparatus and its adaptability for different steering purposes or different kinds of condition-responsive governing means. For instance, instead of applying a pressure-responsive governing device, the governing member associated with the oscillatory drive may be responsive to an acoustic, radio-electric, or other condition. The travel in a horizontal plane, controlled by the rudders of the illustrated sample, can also be governed in accordance with the invention by associating the oscillatory device with a direction-determining gyroscope, acoustic or other device with or without the angle-limiting feature explained in the foregoing. It will also be understood that the electric control circuit and relay exemplified by the drawing can be partly or wholly replaced by other means of energy transmission, such as a hydraulic control on servo-motor system in which valves are empoyed instead of the electric contacts here specifically described.

It will, therefore, be understood by those skilled in the art that my invention does not necessarily require the use of the details specifically described, but can be modified in various ways without departing from the novel principles here disclosed and within the scope of the features set forth in the claims annexed hereto.

I claim as my invention:

1. A control system for torpedoes, comprising elevation control means, a pressure-responsive device having a first contact member movable in dependence upon ambient pressure, a second contact member engageable by said first member, electric circuit means disposed for energizing said control means and having relay means connected with said contact members to be controlled thereby so as to cause said control means to change the elevation of the traveling torpedo in opposite directions depending upon whether said members are mutually engaged and disengaged respectively, and a periodically operating device connected with said second member for moving it alternately toward and away from said first member so that the interval of engagement of said member during each period of said drive varies in dependence upon the pressure-controlled position of said first member.

2. A control system for torpedoes and the like self-propelled apparatus comprising steering control means, condition-responsive means having a first control member movable in dependence upon a condition of torpedo travel, a second control member engageable with said first member, said control members being connected with said steering control means for causing said steering control means to angularly change the path of travel in opposite directions in response to said members being mutually engaged and disengaged respectively, a periodically operating drive for moving said second member alternately toward and away from said first member so that the interval of engagement of said member during each period of said drive varies in dependence upon the pressure-controlled position of said first member, and lost-motion means interposed between said second member and said drive for permitting said member to engage said first member during the entire duration of said period when said first member is moved beyond a given extent toward said second member, said member being disposed to remain disengaged during the entire duration of said period when said first member is moved beyond a given extent away from said second member.

3. A control system for torpedoes, comprising elevation control means, a pressure-responsive device having a first contact member movable in dependence upon ambient pressure, a second contact member engageable by said first member, electric circuit means disposed for energizing said control means and having relay means connected with said contact members to be controlled thereby so as to cause said control means to change the elevation of the traveling torpedo in opposite directions depending upon whether said members are mutually engaged and disengaged respectively, a periodically operating drive for moving said second member alternately toward and away from said first member so that the interval of engagement of said member during each period of said drive varies in dependence upon the pressure-controlled position of said first member, lost-motion means disposed to permit said second member to engage said first member during the entire duration of said period when said first member is moved beyond a given extent toward said second member, said member being disposed to remain disengaged during the entire duration of said period when said first member is moved beyond a given extent away from said second member, a pendulum, and contact means controlled by said pendulum and connected with said circuit means for reversing said relay means in response to excessively curved travel of the torpedo so as to thereby limit the angle of inclination of the resultant path of travel.

4. A control system for torpedoes having steering means, comprising electric actuating means for moving the steering means, an electric relay having a contact member movable between two positions for controlling said actuating means to move the steering means in opposite directions respectively, said member being biased toward one of said positions, an electric circuit having two contacts engageable with each other for controlling said relay to move said member to said other position, periodically operating drive means for causing said contacts to alternately engage and disengage each other, and a condition-responsive device for varying the interval of engagement of said contacts during each period of said drive means in response to a given traveling condition of the torpedo.

5. A control system for torpedoes, comprising elevator means, an electric relay having a contact means connected with said elevator means and movable between two positions for causing said elevator means to effect ascending and descending travel respectively of the torpedo, said member being biased toward one of the said positions, an electric circuit disposed for controlling said relay to move said member to said other position and having two mutually engageable contacts, periodic drive means for moving one of said contacts toward said other contact to normally cause said contacts to be engaged and disengaged in alternate intervals during each period of said drive means, pressure-responsive means subject to ambient pressure and connected with said other contact to displace it relative to said one contact in order to vary said interval in dependence upon said pressure, whereby said intervals are substantially equal when the torpedo travels at an elevation corresponding to a given value of said pressure.

6. A control system for torpedoes, comprising elevator control means, an electric relay having a contact means connected with said elevator means and movable between two positions for causing said elevator means to effect ascending and descending travel respectively of the torpedo, said member being biased toward one of said positions, an electric circuit disposed for controlling said relay to move said member to said other position and having two mutually engageable contacts, periodic drive means for moving one of said contacts toward said other contact to normally cause said contacts to be engaged and disengaged in alternate intervals during each period of said drive means, pressure-responsive means subject to ambient pressure and connected with said other contact to displace it relative to said one contact in order to vary said interval in dependence upon said pressure, an inertia device responsive to changes in angular position of the torpedo and having contacts associated with said circuit for causing said relay to reverse the position of said member relative to the one obtaining when the angular position of the torpedo exceeds a given value.

7. A control system for torpedoes, comprising elevator means, an electric relay having a contact means connected with said elevator means and movable between two positions for causing said elevator means to effect ascending and descending respectively of the torpedo, said member being biased toward one of said positions, an electric circuit disposed for controlling said relay to move said member to said other position and having two mutually engageable contacts, periodic drive means for moving one of said contacts toward said other contact to normally cause said contacts to be engaged and disengaged in alternate intervals during each period of said drive means, pressure-responsive means subject to ambient pressure and connected with said other contact to displace it relative to said one contact in order to vary said intervals in dependence upon said pressure, a pendulum disposed to be deflectable about a horizontal axis transverse to the traveling direction of the torpedo, two contact devices arranged relative to said pendulum so as to be selectively controlled by said pendulum when the latter deflects in one and the other direction respectively relative to the torpedo, one of said contact devices being disposed in said circuit for rendering said circuit ineffective when said pendulum deflects a given angle in one direction so that then said member is permitted to follow its bias regardless of the condition of said two contacts, and said other contact device being connected with said relay for causing it to actuate said member against its bias also regardless of the condition of said two contacts.

References Cited in the file of this patent

UNITED STATES PATENTS

| | | |
|---|---|---|
| 933,083 | Leavitt | Sept. 7, 1909 |
| 1,360,276 | Eaton | Nov. 30, 1920 |
| 2,996,029 | Jones | Aug. 15, 1961 |